United States Patent [19]
Bela

[11] Patent Number: 5,176,896
[45] Date of Patent: Jan. 5, 1993

[54] APPARATUS AND METHOD FOR GENERATION OF CONTROL SIGNAL FOR CLAUS PROCESS OPTIMIZATION

[75] Inventor: Frank A. Bela, Los Alamitos, Calif.

[73] Assignee: Texaco Inc., White Plains, N.Y.

[21] Appl. No.: 210,538

[22] Filed: Jun. 23, 1988

[51] Int. Cl.$^5$ .................... C01B 17/04; G01N 31/10
[52] U.S. Cl. ..................... 423/574 R; 436/120; 436/121
[58] Field of Search ............ 423/224, 574 R; 436/102, 119, 120, 121, 122, 123

[56] References Cited

U.S. PATENT DOCUMENTS

| | | | |
|---|---|---|---|
| Re. 28,864 | 6/1976 | Andral et al. | 423/574 R |
| 3,854,876 | 12/1974 | Rankine et al. | 423/574 R |
| 4,100,266 | 7/1978 | Smith | 423/574 R |
| 4,171,347 | 10/1979 | Hass | 423/539 |
| 4,279,882 | 7/1981 | Beavon | 423/574 R |
| 4,509,327 | 4/1985 | Enga | 60/285 |
| 4,543,245 | 9/1985 | Peterman et al. | 423/574 R |
| 4,617,794 | 10/1986 | Fujitani et al. | 60/285 |

FOREIGN PATENT DOCUMENTS

| | | | |
|---|---|---|---|
| 44844 | 4/1981 | Japan | 436/120 |
| 631444 | 11/1978 | U.S.S.R. | 423/574 R |

Primary Examiner—Jeffrey E. Russel
Attorney, Agent, or Firm—Robert A. Kulason; James J. O'Loughlin; Varl G. Seutter

[57] ABSTRACT

An apparatus and method for the generation of a control signal for the optimization of sulfur removal in a Claus process unit comprises oxidizing a portion of the tail gas stream exiting the Claus unit by contacting a portion of the tail gas with an oxygen-containing gas in the presence of a catalyst which oxidizes $H_2S$ to $SO_2$, measuring the temperature rise associated with the oxidation reaction, converting the measurement to an appropriate control signal, and using the signal to control the rate of air flow into the Claus unit.

11 Claims, 2 Drawing Sheets

APPARATUS AND METHOD FOR GENERATION OF CONTROL SIGNAL FOR CLAUS PROCESS OPTIMIZATION

BACKGROUND OF THE INVENTION

1. Field of the Invention

This invention relates to an apparatus and method for generation of a control signal for the optimization of sulfur removal in a Claus process unit. More particularly, this invention relates to: (i) an apparatus for generation of a control signal for the optimization of sulfur removal in a Claus process unit, the apparatus comprising means for inducing the flow of a portion of Claus unit tail gas into the apparatus, means for heating the portion of tail gas, means for catalytically oxidizing $H_2S$ contained within the tail gas to $SO_2$, and means for measuring the temperature rise associated with the oxidation reaction and converting the measurement to an appropriate control signal to control the rate of air flow into the Claus unit; and (ii) a method of generation of a control signal for the optimization of sulfur removal in a Claus process unit, the method comprising inducing the flow of a portion of Claus unit tail gas into the abovedescribed apparatus, heating the portion of tail gas, catalytically oxidizing the portion of tail gas in the presence of an oxygen-containing gas to cause the oxidation of $H_2S$ to $SO_2$, measuring the temperature rise associated with the oxidation reaction, converting the measurement to an appropriate signal, and using the signal to control the rate of air flow into the Claus unit.

2. Information Disclosure Statement

It is well known to those skilled in the art that elemental sulfur may be recovered from $H_2S$-containing gas streams by employing the Claus process or modified Claus process. These processes are discussed, for example, in Vol. 22 of the Kirk-Othmer Encyclopedia of Chemical Technology at pp. 276-82 (3d ed. 1983) and H. Paskall, "Basis of the Claus Process" (Western Research—Calgary, Alberta, Canada (Sep. 1981)). Most modern sulfur-recovery plants are based upon the modified Claus process. The modified Claus process typically converts $H_2S$ to elemental sulfur according to the series of reactions

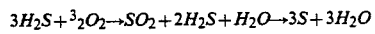

$$3H_2S + {}^3_2O_2 \rightarrow SO_2 + 2H_2S + H_2O \rightarrow 3S + 3H_2O$$

where approximately ⅓ of the $H_2S$ is initially oxidized to $SO_2$ by combustion with air, and residual $H_2S$ subsequently reacts with the $SO_2$ to form elemental sulfur. Approximately 50% of the product sulfur is formed immediately in the Claus process unit combustion zone, with remaining $H_2S$ conversion accomplished in a series (typically 1-4) of downstream catalytic stages. Tail gas containing residual amounts of $H_2S$ and $SO_2$ exits the Claus process unit, and must be further treated prior to discharge into the atmosphere.

Maximum sulfur recovery is achieved when the proportions of air/$O_2$ and $H_2S$ conform to the abovedescribed stoichiometry. To achieve the correct stoichiometric ratio, the traditional control approach has been to adjust the air flow rate entering the Claus unit so as to maintain a tail gas $H_2S/SO_2$ ratio=2. However, the more recent trend has been to express the tail gas $H_2S/SO_2$ concentration control parameter in terms of "excess $H_2S$" or "air demand" ($H_2S - 2SO_2$) or "excess $SO_2$" ($2SO_2 - H_2S$) The "excess $H_2S$" or "excess $SO_2$" approach is often preferred over the $H_2S/SO_2$ ratio as a control parameter because it yields a control signal linearly proportional to the required change in air flow rate required to achieve correct stoichiometry. References describing methods for Claus unit process control include M. C. J. Beamish, "Controlling the Claus Process" (Western Research-Calgary, Alberta, Canada (Sep. 1982)) and G. W. Taggart, "Optimize Claus Control", Hydrocarbon Processing (Dec. 1980).

From the above, it is clear that accuracy and reliability of analysis of the $H_2S$ concentration in the tail gas is of fundamental importance in providing for reliable and accurate control of the air flow entering the Claus unit and subsequent optimization of sulfur recovery, as discussed in P. Grancher, "Advances in Claus Technology", Hydrocarbon Processing (Sep. 1978) pp. 257-62. For example, the most sophisticated Claus units use feed forward control schemes, whereby continuous onstream analysis of the feed gas (in addition to tail gas analysis) serves as a basis for automatic incoming air flow rate adjustment to compensate for changes in gas quality. However, feed forward control is sensitive to errors in input data, and therefore requires accurate gas analysis, as described in G. Taggart, "Be Careful of Feedforward for Claus Control", Hydrocarbon Processing (Mar. 1981). Thus, there is a need for an accurate, reliable and cost-effective means of generating a control signal for control of air flow into the Claus unit by analyzing tail gas composition.

Various methods of analyzing Claus unit tail-gas composition are discussed, for example, in J. W. Palm & N. M. Caruthers, "Guidelines And Control of SRU Tail Gas Composition", Oil and Gas Journal (Nov. 20, 1978), pp. 151-55. These methods include older titration techniques such as the Tutweiler method and on-line analysis techniques such as gas chromatography and ultraviolet spectrophotometry. On-line gas composition analyzers, including flammable-vapor analyzers, are discussed for example in J. T. Y. Yeh, "Online Composition Analyzers", Chemical Engineering (Jan. 20, 1986), pp. 55-68. Flammable-vapor analyzers feed a sample of flammable vapor, along with air, into a controlled flame. The vapor then burns, releasing heat measured by a temperature detector. The concentration of flammable vapor is determined by the measured temperature. In another version, air containing flammable vapors is passed over a temperature detector coated or encased in a catalyst which causes combustion and a certain temperature increase that correlates with flammable-vapor concentration. On-line ultraviolet spectrophotometers for use in continuous monitoring of sulfur recovery units are described, for example, in the product literature of Du Pont Model 4620 Sulfur Recovery Unit Analyzer System (available from Du Pont Company—Analytical Instruments Division) and Western Research Model 700 Air Demand Analyzer System (available from Western Research, a division of Bow Valley Resource Services Ltd. (Canada)).

The method and apparatus of the instant invention relate to the generation of a control signal for the optimization of sulfur removal in a Claus process unit. The signal is generated by oxidizing a portion of the Claus unit tail gas stream in the presence of a catalyst capable of oxidizing $H_2S$ contained within the tail gas stream to $SO_2$, measuring the temperature rise associated with the oxidation reaction, converting the measurement to an appropriate control signal, and using the signal to control air flow rate into the Claus unit to achieve stoichiometry. The catalytic oxidation of sulfur to $SO_2$ is described, for example, in:

G. J. Shugar, R. A. Shugar, and L. Bauman, Chemical Technicians' Ready Reference Handbook, p. 258-60, which discloses a method of determining sulfur content by conversion of organic sulfur to $SO_2$ via high temperature (1300° C.) combustion in the presence of pure oxygen and a $V_2O_5$ catalyst;

U.S. Pat. No. 4,279,882 (Beavon), which discloses a process for sulfur production which is applicable to the treatment of $H_2S$-containing gas streams, the process comprising contacting at a temperature below 850° F., an $H_2S$-containing gas stream with oxygen or air and a recycle gas containing $H_2S$ and $SO_2$ in the presence of a selective oxidation catalyst capable of selectively oxidizing $H_2S$ to $SO_2$ without formation of $SO_3$, the catalyst preferably comprising a vanadium oxide (e.g. $V_2O_5$) on a non-alkaline porous refractory oxide; and U.S. Pat. No. 4,171,347 (Hass), which discloses a catalytic for conversion of $H_2S$ to $SO_2$, the catalyst comprising one or more vanadium oxides or sulfides (e.g. $V_2O_5$) on a non-alkaline porous refractory oxide. The catalyst selectively oxidizes $H_2S$ to $SO_2$ in the presence of air, $H_2$, CO, light hydrocarbons, and ammonia. The catalytic reaction is highly exothermic, with the reactor temperature rising proportionately to the concentration of $H_2S$ in the feed gas-oxidant mixture; and R. H. Hass et al., "Process Meets Sulfur Recovery Needs," Hydrocarbon Processing (May 1981), pp. 104-07, which discloses a catalytic process for gas stream sulfur recovery.

SUMMARY OF THE INVENTION

The instant invention relates to an apparatus and method for the generation of a control signal for the optimization of sulfur removal in a Claus process unit. The apparatus of the instant invention comprises:

(a) a housing having an entrance end, a chamber section containing a bed of catalyst particles capable of oxidizing $H_2S$ to $SO_2$, and an exit end, so connected that the entrance end, chamber section, and exit end have a continuous passage therethrough designed to permit flow of a portion of a Claus unit tail gas stream into the entrance end, through the chamber section, and out of the exit end;

(b) means for inducing the flow of the portion of tail gas stream into the entrance end, through the chamber section, and out the exit end of the housing;

(c) means for heating the portion of tail gas stream and an oxygen-containing gas stream to a temperature of 300°-700° F. subsequent to the gas streams entering the entrance end of the housing and prior to the mixing of the tail gas and oxygen-containing gas streams;

(d) means for mixing the heated portion of tail gas stream with the heated oxygen-containing gas stream prior to the introduction of the resulting gas stream mixture into the chamber section;

(e) means for measuring the temperature of the combusted gas stream mixture as it exits from the chamber section; and (f) means for converting the measured temperature of the combusted gas stream mixture exiting the chamber section to an appropriate control signal.

The method of the instant invention comprises:

(a) inducing the flow of a portion of Claus unit tail gas stream into the entrance end of an apparatus comprising a housing having an entrance end, a chamber section containing a bed of catalyst particles capable of oxidizing $H_2S$ to $SO_2$, and an exit end, so connected that the entrance end, chamber section, and exit end have a continuous passage therethrough designed to permit flow of the heated tail gas stream into the entrance end, through the chamber section, and out of the exit end;

(b) heating the portion of tail gas stream and an oxygen-containing gas stream to a temperature of 300°-700° F. subsequent to the gas streams entering the entrance end of the housing and prior to the mixing of the tail gas and oxygen-containing gas streams;

(c) mixing the heated tail gas stream with the heated oxygen-containing gas stream prior to the introduction of the resulting gas stream mixture into the chamber section;

(d) contacting the resulting gas stream mixture with the catalyst in the chamber section;

(e) measuring the temperature of the combusted gas stream mixture as it exits the chamber section;

(f) converting the measured temperature of the combusted gas stream mixture to an appropriate control signal; and (g) transmitting the signal to a flow controller controlling the air flow rate entering the Claus unit.

The method and apparatus of the instant invention are advantageous in that they provide an inexpensive and low maintenance means for generating a control signal for controlling the air flow rate entering the Claus process, thereby enabling Claus process optimization and subsequent optimization of sulfur recovery from the $H_2S$-containing gas stream treated via the Claus process.

DETAILED EMBODIMENTS OF THE INVENTION

It is one object of this invention to provide an apparatus for generation of a control signal for the optimization of sulfur removal in a Claus process unit. It is another object of this invention to provide a method of generation of a control signal for the optimization of sulfur removal in a Claus process unit.

It is one feature of this invention to provide an apparatus for generation of a control signal for the optimization of sulfur removal in a Claus process unit, the apparatus comprising means for heating a portion of Claus unit tail gas, means for inducing the flow of a portion of tail gas into the apparatus, means for oxidizing $H_2S$ contained within the tail gas to $SO_2$ in the presence of a catalyst which oxidizes $H_2S$ to $SO_2$, means for measuring the temperature rise associated with the oxidation reaction, and means for converting the measurement to an appropriate control signal to control the rate of air flow into the Claus unit. It is another feature of this invention to provide a method of generation of a control signal for sulfur removal optimization in a Claus process unit, the method comprising heating a portion of Claus unit tail gas, inducing the flow of the portion of tail gas into the abovedescribed apparatus, catalytically oxidizing the tail gas portion in the presence of an oxygen-containing gas to cause the oxidation of $H_2S$ to $SO_2$, measuring the temperature rise associated with the oxidation reaction, converting the measurement to an appropriate control signal, and using the signal to control the rate of air flow into the Claus unit.

The method of the instant invention is advantageous in that it provides an inexpensive and low maintenance method of generating a control signal. The apparatus of the instant invention is advantageous in that it provides an inexpensive and low maintenance alternative to the use of on-line spectrophotometric or ultraviolet analyzers to measure $H_2S$ concentration in the tail gas and provide an appropriate control signal to regulate the rate of air flow into the Claus unit.

Figure 1:
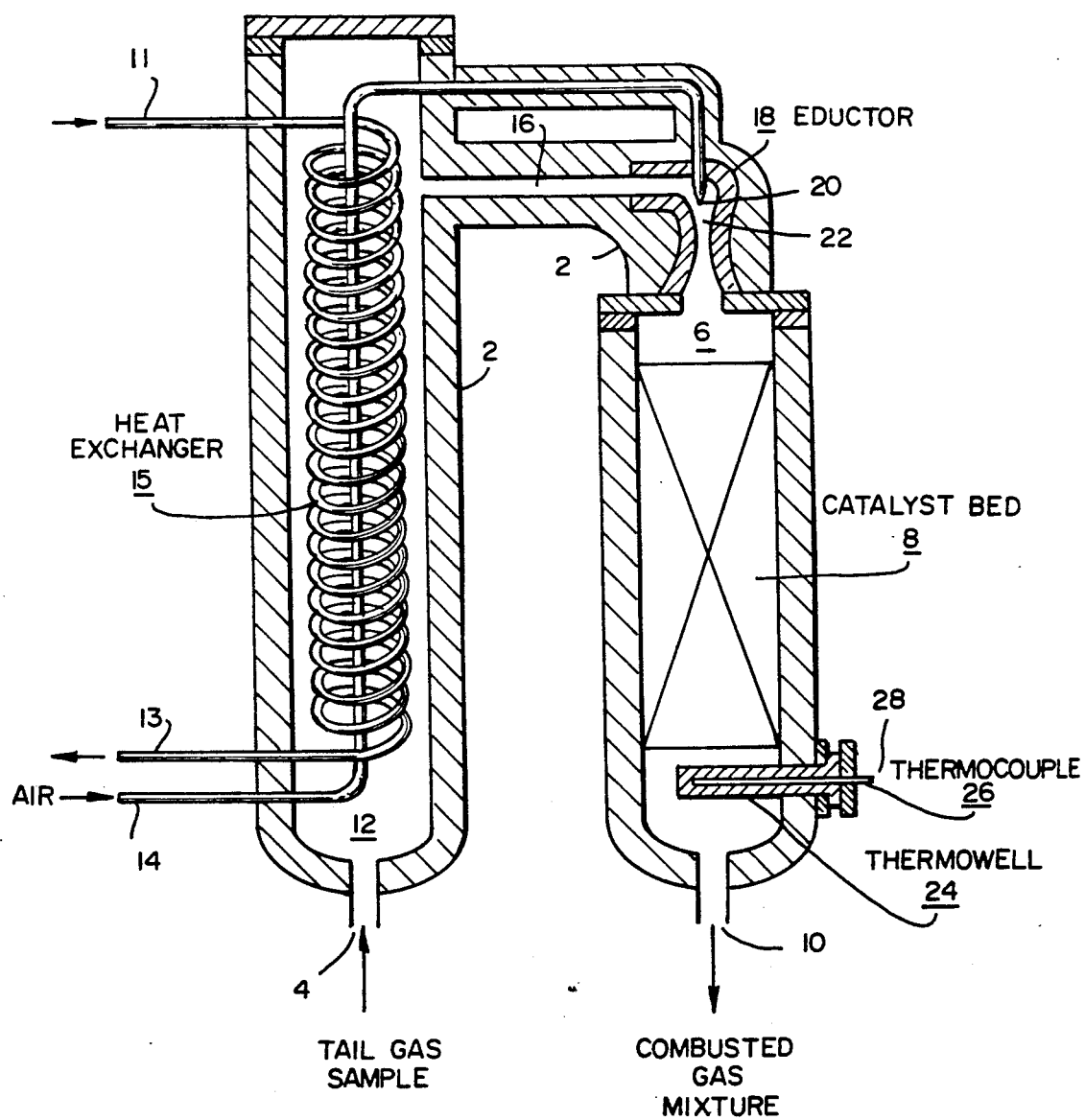
FIG. 1 depicts a cross-sectional view of a preferred embodiment of the apparatus of the instant invention.

A cross-sectional view of a preferred embodiment of the apparatus of the instant invention is depicted in FIG. 1. The apparatus comprises a housing 2, an entrance end 4, a chamber section 6 containing a bed of catalyst particles 8 capable of selectively oxidizing $H_2S$ to $SO_2$, and an exit end 10, so connected as to provide a continuous passage therethrough. A portion of Claus unit tail gas, comprising $H_2S$ and other compounds, preferably less than 5% $H_2S$, at a temperature of 250°-700° F., a pressure of 10-20 psia, say atmospheric pressure, and a flow rate of 1-100 SCFM, preferably 1-20 SCFM, say 8 SCFM is directed through entrance end 4 into interior portion 12 of housing 2. Although conventional Claus unit tail gas analyzers typically monitor tail gas obtained from the final (usually third) stage of the Claus process unit, in the apparatus and method of the instant invention it is a preferred embodiment that the portion of Claus unit tail gas to be directed to the apparatus be obtained from the outlet of the second stage of the Claus unit, as such a portion of tail gas has a higher residual $H_2S$ concentration and hence will produce a greater temperature change range upon $H_2S$ oxidation in the apparatus.

The tail gas sample is induced to flow through the apparatus of the instant invention by an eductor 18 which is located within the housing 2. The eductor 18 is supplied with an oxygen-containing gas, preferably compressed air, at a flow rate of 0.5-10 SCFM, say 2 SCFM, and a pressure of 1-100 psig, say 40 psig, through line 14, and is introduced into the interior portion 22 of eductor 18 through outlet nozzle 20. The tail gas sample enters the interior portion 12 of housing 2 through entrance end 4 and is drawn through passageway 16 to eductor 18. It is to be understood that the interior portion of eductor 18 as depicted in FIG. 1 is for illustrative purposes only, as the design, construction, and operation of eductor devices are well known to those skilled in the art. Any conventional eductor device which is capable of inducing flow of the tail gas sample into the apparatus and mixing the tail gas sample with an oxygen-containing gas may be employed in the apparatus of the instant invention.

The tail gas sample and oxygen-containing gas are both heated, if necessary, prior to admixture in interior portion 22 of eductor 18. Heating is accomplished by means of a heat exchanger 15 located within interior portion 12 of housing 2. In one embodiment, the heat exchanger 15 is of the electrical type whereby heat is generated by the resistance of heating elements to electrical current passed therethrough. In another embodiment, which is depicted in FIG. 1, the heat exchanger 15 is a coiled tube or pipe which is coiled around the exterior of line 14 which supplies oxygen-containing gas to eductor 18. In this embodiment, a heat transfer medium such as high pressure (i.e. 200-600 psig) steam, flue gas, or commercially available heat transfer fluids such as DOWTHERM or THERMINOL enters heat exchanger 15 via inlet line 11 and flows countercurrently through the interior of heat exchanger 15 where heat transfer simultaneously takes place between the heat transfer medium, oxygen-containing gas flowing through line 14 to eductor 18, and tail gas sample which flows through interior portion 12 of housing 2 and passageway 16 to eductor 18. The heat transfer medium exits heat exchanger 15 through line 13. Heat is imparted to the tail gas stream and oxygen-containing gas stream in such a manner as to insure that the temperature of the mixture of tail gas and oxygen-containing gas produced in the interior portion 22 of eductor 18 is in the temperature range of 300°-700° F when the mixture enters chamber section 6. It is necessary that the temperature of the gas mixture be in the prescribed range to initiate the catalytic reaction and, in at least some cases, prevent subsequent deactivation of catalyst bed 8 due to sulfur condensation. Note that in other embodiments of this invention, heating of the oxygen-containing gas and tail gas sample stream may not be necessary due to higher (say greater than 450° F.) inlet temperatures of the tail gas sample into the apparatus.

The resulting gas stream mixture of heated tail gas sample and heated oxygen-containing gas flows from the interior portion 22 of eductor 18 to the chamber section 6, which contains a bed of catalyst particles 8 capable of oxidizing $H_2S$ contained in the gas mixture to $SO_2$. Such catalysts include $H_2S$ oxidation catalysts which promote the oxidation of combustibles such as $H_2$ and CO as well as $H_2S$. Catalysts of this type include titanium oxide-based catalyst CRS-31, commercially available from Rhone-Poulenc and employed in the process for catalytic treatment of Claus unit tail gases disclosed in R. Kettner & N. Liermann, "New Claus tail-gas process proved in 63-66, and Shell Chemical Company's Shell 099 alumina-based catalytic incineration catalyst, which is designed for incineration of Claus process and Claus tail gas clean-up unit tail gases.

In a preferred embodiment, the catalyst to be employed in the apparatus of the instant invention is one which selectively oxidizes $H_2S$ contained in the gas mixture to $SO_2$. By employing such a selective catalyst, the heat release from combustion is less than that obtained when a catalyst which promotes oxidation of other combustibles (e.g. $H_2$ and CO), and results in production of a temperature (and hence control) signal that is more responsive to changes in tail gas $H_2S$ concentration A preferred selective catalyst to be employed comprises 1-15 wt. %, preferably 5-15 wt. % of an oxide or sulfide of vanadium, preferably $V_2O_5$, on a non-alkaline porous refractory oxide support, preferably hydrogen mordenite or alumina. The preferred selective catalyst is commercially available from Union Oil Company of California under the SELECTOX-33 trade name. The composition and use of SELECTOX-33 catalyst is described, for example, in U.S. Pat. No. 4,279,882, U.S. Pat. No. 4,171,347, and R. H. Hass et al., "Process Meets Sulfur Recovery Needs", previously discussed.

As the gas mixture passes through the catalyst bed 8 and contacts the individual catalyst particles, $H_2S$ contained in the gas mixture is oxidized to $SO_2$. The nominal space velocity through the catalyst bed 8 may be about 500–15,000 v/v/hr, more preferably 1000–10,000 v/v/hr, most preferably 2000–5000 v/v/hr. This reaction is highly exothermic, causing a rise in gas temperature as the gas mixture exits the chamber section 6. To initiate the oxidation reaction, it is necessary that a temperature of 300°–700° F., preferably 450°–500° F., say 500° F. be maintained within interior portion 12 of housing 2. It is therefore important that housing 2 be well insulated to minimize heat losses to the surrounding environment.

Means for measuring the temperature of the combusted gas stream mixture as it exits catalyst bed 8 are preferably a thermowell 24 into which a thermocouple 26 is inserted. The thermocouple has a temperature detecting range of 300°–1000° F., preferably 500°–600° F. Any conventional arrangement of thermowell and thermocouple known to those skilled in the art which adequately provides means to measure the temperature of the combusted gas stream mixture as it exits the chamber section 6 may be employed. The measured temperature is converted to an appropriate control signal by the thermocouple 26. The signal, which may be electrical or pneumatic, is transmitted via wire or conduit 28, respectively, to a flow controller (not shown) which controls the air flow into the Claus process unit. The gas mixture is discharged from the interior of the housing 2 through exit end 10 and may be subsequently directed to the Claus unit tail gas stream for further treatment prior to discharge into the atmosphere or recycle back to the Claus process unit.

Figure 2:
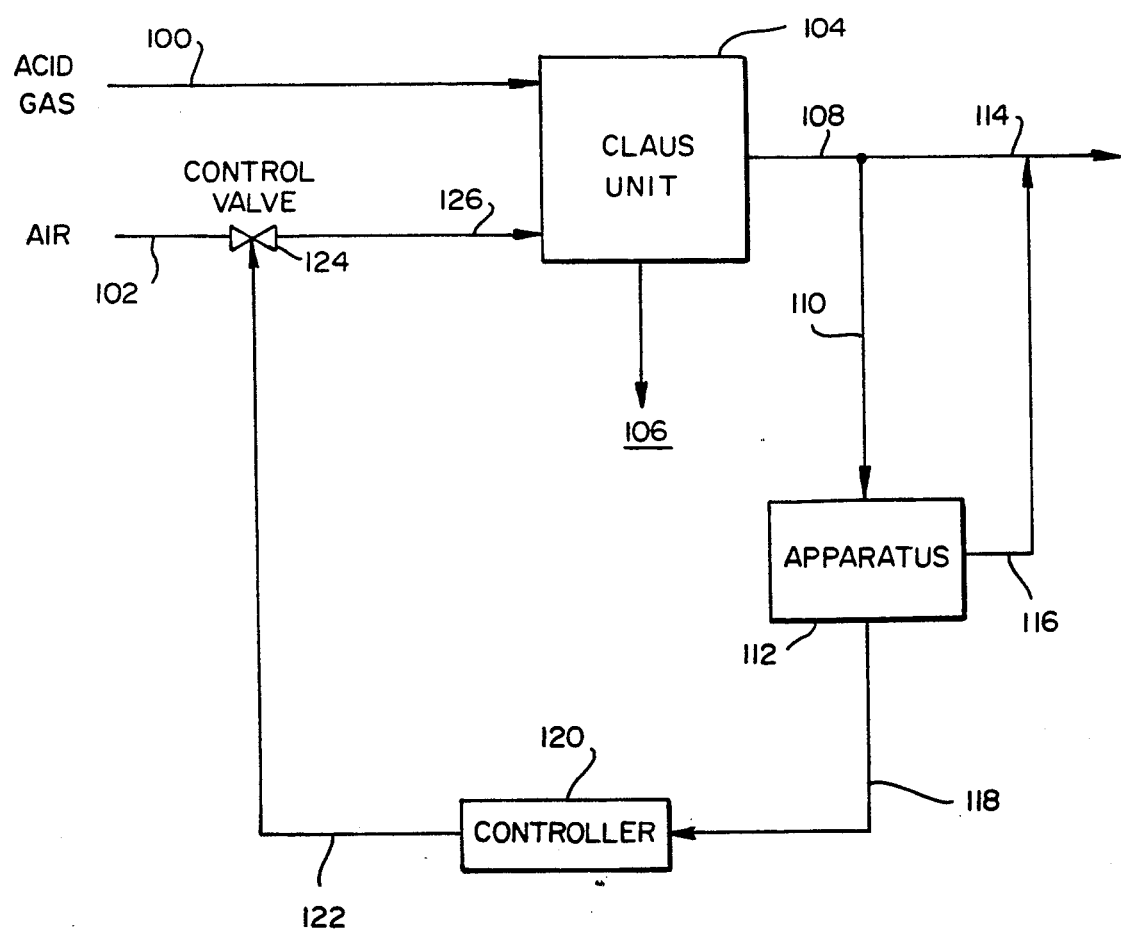
FIG. 2 is a schematic drawing depicting a preferred embodiment of the method of the instant invention.

A schematic drawing depicting a preferred embodiment of the method of the instant invention is set forth in FIG. 2. In FIG. 2, a $H_2S$-containing acid gas stream 100 and an air stream 102 enter Claus process unit 104. Elemental sulfur is removed from the acid gas via the Claus process and exits the process via line 106, and tail gas exits the Claus unit through line 108. A portion of the tail gas stream is directed via line 110 to the apparatus of the instant invention 112 (as set forth in FIG. 1), and the remainder of tail gas is directed through line 114 for further treatment, recycle, or eventual discharge to the atmosphere.

Tail gas stream 110 is heated and catalytically oxidized in apparatus 112, and the combusted gas mixture is discharged from apparatus 112 through line 116. The combusted gas mixture normally will be returned via line 116 to the tail gas stream contained in line 114. Such a configuration is advantageous in that it automatically balances fluctuations in tail gas sample pressure which tend to change the ratio of oxygen-containing gas/tail gas sample, and which in turn could result in misleading changes in apparatus outlet temperature.

The temperature of the tail gas stream 110 subsequent to catalytic oxidation in apparatus 112 is measured, converted to an appropriate control signal which may be electronic or pneumatic, and transmitted via line 118 to controller 120. Controller 120 converts the input signal transmitted via line 118 to an appropriate output signal based upon. The measured temperature and correlated $H_2S$ concentration of the tail gas stream. The output signal generated by controller 120 is transmitted via line 122 to air control valve 124, which controls the air flow rate into the Claus unit. The output signal generated by controller 120 transmits a signal to air control valve 124 such that stoichiometric proportions of air-/$O_2$ and $H_2S$ entering the Claus unit from the air and acid gas streams, respectively, are achieved. The corrected air flow is directed via line 126 from air control valve 124 to Claus unit 104. It is to be understood that the configuration depicted for controller 120 and air control valve 124 is but one embodiment of the method of the instant invention. Other controller-control valve configurations known to those of ordinary skill in the invention.

It is to be understood that, in the apparatus and process of the instant invention, the relative $H_2S$ and $SO_2$ concentrations in the tail gas stream must be determined to assess the degree of approach to optimum stoichiometry. The apparatus of the instant invention measures relative changes in tail gas $H_2S$ concentration, which are directly proportional to changes in $H_2S/SO_2$ ratio since changes in concentration of one component are accompanied by a concurrent inverse change in concentration in the other component. Over extended periods of time, the correlation between optimum $H_2S/SO_2$ ratio and apparatus outlet temperature may drift due to long term changes in process conditions. It is therefore necessary, in the practice of the instant invention, to occasionally determine the relative $H_2S/SO_2$ concentrations by conventional means known to those skilled in the art, such as length-of-stain detector tubes, laboratory gas chromatography or wet chemistry. The required frequency of such testing in conjunction with the apparatus and method of the instant invention is expected to be less than once per day.

It will be evident that the terms and expressions employed herein are used as terms of description and not of limitation. There is no intention, in the use of these descriptive terms and expressions, of excluding equivalents of the features described and it is recognized that various modifications are possible within the scope of the invention claimed.

The invention claimed is:

1. A method for generating a control signal for optimization of a Claus gas-desulfurization unit which comprises:
   (a) withdrawing from the tail gas of a Claus gas-desulfurization unit a sample of tail gas containing hydrogen sulfide;
   (b) inducing the flow of said sample of tail gas containing hydrogen sulfide into the entrance end of an apparatus having a housing including (i) an entrance thereto at an entrance end, (ii) a chamber section therein containing a bed of catalyst particles capable of oxidizing hydrogen sulfide to sulfur dioxide, and (iii) an exit therefrom at an exit end of said housing whereby said sample of tail gas containing hydrogen sulfide may flow into the entrance, through the bed of catalyst particles in the chamber section, and out of the exit of said housing;
   (c) heating said sample of tail gas containing hydrogen sulfide to 300° F.–700° F. within said housing thereby forming a heated sample of tail gas containing hydrogen sulfide;
   (d) heating an oxygen-containing gas to 300°–700° F. thereby forming a heated oxygen-containing gas;
   (e) mixing said heated sample of tail gas containing hydrogen sulfide and said heated oxygen-containing gas thereby forming a gas stream mixture;
   (f) passing said gas stream mixture into said chamber section of said housing wherein said gas stream mixture contacts said catalyst in said chamber section, and hydrogen sulfide in said gas stream mixture is combusted thereby forming a combusted gas stream of increased temperature;

(g) passing said combusted gas stream of increased temperature to the exit of said housing at which point said combusted gas stream of increased temperature exists said housing;

(h) measuring the temperature of said combusted stream of increased temperature at a point prior to the point at which said combusted gas stream of increased temperature exits said housing;

(i) converting the measured temperature of the combusted gas stream of increased temperature to a control signal; and (j) controlling the rate of air flow entering said Claus unit in accordance with said control signal.

2. A method as defined in claim 1, wherein said sample of tail gas and oxygen-containing gas are heated to a temperature of 300°–700° F. by means of an electrical heater located within the housing.

3. A method as defined in claim 1, wherein said sample of tail gas and oxygen-containing gas are heated to a temperature of 300°–700° F. by means of a heat exchanger located within the housing and supplied with a heat transfer fluid.

4. A method as defined in claim 1, wherein said inducing of the flow of the sample of tail gas into the entrance end and the sample mixing of the tail gas with the oxygen-containing gas is accomplished by an eductor supplied with compressed air and located within the housing.

5. A method as defined in claim 1, wherein said catalyst is capable of selectively oxidizing $H_2S$ to $SO_2$.

6. A method as defined in claim 1, wherein said catalyst comprises an oxide or sulfide of vanadium on a non-alkaline porous refractory oxide support.

7. A method as defined in claim 6, wherein said catalyst comprises 1–15 weight percent $V_2O_5$ on a non-alkaline porous refractory oxide support.

8. A method as defined in claim 1, wherein said catalyst comprises an oxide of titanium.

9. A method as defined in claim 1, wherein said temperature is measured and converted to a control signal by having the gas mixture contact a thermocouple having a temperature detecting range of 300°–1000° F.

10. A method as defined in claim 9, wherein said thermocouple has a temperature detecting range of 500°–600° F.

11. A method for generating a control signal for optimization of a Claus gas-desulfurization unit which comprises (a) withdrawing from the tail gas of a Claus gas-desulfurization unit a sample of tail gas containing hydrogen sulfide;

(b) inducing the flow of said sample of tail gas containing hydrogen sulfide into the entrance end of an apparatus comprising a housing including (i) an entrance thereto at an entrance end, (ii) a chamber section therein containing a bed of catalyst particles comprising 1–15 wt. % vanadium pentoxide on a non-alkaline porous refractory oxide support, and (iii) an exit therefrom at an exit end of said housing whereby said sample of tail gas containing hydrogen sulfide may flow into the entrance, through the bed of catalyst chamber particles in said section, and out of the exit of said housing;

(c) heating said sample of tail gas containing hydrogen sulfide to 300° F.–700° F. within said housing thereby forming a heated sample of tail gas containing hydrogen sulfide;

(d) heating an oxygen-containing gas to 300°–700° F. thereby forming a heated oxygen-containing gas;

(e) mixing said heated sample of tail gas containing hydrogen sulfide and said heated oxygen-containing gas thereby forming a gas stream mixture;

(f) passing said gas stream mixture into said chamber section of said housing wherein said gas stream mixture contacts said catalyst in said chamber section, and hydrogen sulfide in said gas stream mixture is combusted thereby forming a combusted gas stream of increased temperature;

(g) passing said combusted gas stream of increased temperature to the exit of said housing at which point said combusted gas stream of increased temperature exists said housing;

(h) measuring the temperature of said combusted stream of increased temperature at a point prior to the point at which said combusted gas stream of increased temperature exits said housing;

(i) converting the measured temperature of the combusted gas stream of increased temperature to a control signal; and (j) controlling the rate of air flow entering said Claus unit in accordance with said control signal.

* * * * *